United States Patent [19]
Maeda et al.

[11] Patent Number: 5,843,350
[45] Date of Patent: Dec. 1, 1998

[54] METHOD OF MANUFACTURING LAYERED STRUCTURE

[75] Inventors: Matabee Maeda; Kazuie Yamada; Akira Uchida; Masaaki Miyata; Shinichi Igawa; Hideto Karasawa, all of Chiyoda-ku, Japan

[73] Assignee: Maeda Corporation, Tokyo, Japan

[21] Appl. No.: 822,280

[22] Filed: Mar. 20, 1997

[30] Foreign Application Priority Data

Apr. 20, 1996 [JP] Japan ................................. 8-122245

[51] Int. Cl.$^6$ ........................... B29C 47/06; B29C 47/92
[52] U.S. Cl. ............... 264/40.5; 264/40.7; 264/173.12; 264/173.16
[58] Field of Search ................. 264/40.5, 40.7, 264/173.12, 173.16

[56] References Cited

U.S. PATENT DOCUMENTS 3,924,990  12/1975  Schrenk ........................... 425/131.1
5,269,995  12/1993  Ramanathan et al. ............. 264/173.12

FOREIGN PATENT DOCUMENTS 492894   7/1992  European Pat. Off. .
1308573  5/1961  France .

OTHER PUBLICATIONS

Abstract of Japan 55–154,127 (Published Dec. 1, 1980).
Abstract of Japan 55–154,125 (Published Dec. 1, 1980).

*Primary Examiner*—Leo B. Tentoni
*Attorney, Agent, or Firm*—Greer, Burns & Crain, Ltd.

[57] ABSTRACT

A method of easily consecutively manufacturing a layered structure with the same or different kinds of materials superposed in a plurality of layers, is attained by a simple mechanical method. The layered structure manufacturing method is embodied by use of a shaping apparatus having a unique construction. The shaping apparatus includes a plurality of irregular passageways disposed in a side-by-side relationship in the same direction, wherein sectional configurations of the irregular passageways continuously vary from inlets thereof toward outlets, and the irregular passageways are superposed on each other at the outlets. An apparatus body as a principal portion of the shaping apparatus may be constructed by connecting a plurality of elements in series, which are internally formed with the irregular passageways. Materials to be shaped, which exhibit a fluidity or plasticity, are fed into the inlets of the irregular passageways in the shaping apparatus. The shaped materials thereby flow to the outlets while the sectional configurations thereof are consecutively varied and, during this process, get confluent and diverge while flowing inside the irregular passageways.

8 Claims, 13 Drawing Sheets

METHOD OF MANUFACTURING LAYERED STRUCTURE

BACKGROUND OF THE INVENTION

1. Field of the Invention

The present invention relates generally to a method of manufacturing a layered structure and, more particularly, to a method of manufacturing a layered structure (superposed structure) by placing materials that exhibit a fluidity or plasticity into irregular passageways with varied sectional configurations in order to shape the materials.

2. Description of the Related Art

There has been a variety of layered structures in which a plurality of layers are superposed. For example, the layered structures include foods such as, e.g., pie dough, cakes, puddings, Bavarian cream, dairy products like ice cream or pasta, in addition to kneading products and resin molded products formed by extrusion molding.

The prior art method of manufacturing such a layered structure is roughly includes a method based exclusively on manual work in addition to and a mechanical method. The manual method requires a good deal of labor for manufacturing a last-stage layered structure such as, e.g., the pie dough, and therefore inefficient.

In addition, according to the mechanical method, the apparatus itself becomes complicated and increases costs for manufacturing a multilayered structure. Thus a thin multilayered structure, as in the case of the pie dough, is hard to directly and simultaneously manufacture in terms of viscosity, plasticity and fluidity of the dough. Further, there also is a method of shaping a plurality of materials or a single material by extruding the material via slits formed in a die, in which a multiplicity of slits are formed in parallel at small intervals. This method, however, involves a difficulty if each layer is as extremely thin as, e.g., under 1 mm, and, a variety of problems could arise, wherein the apparatus itself is easily clogged and so forth.

Furthermore, the layered structure may be composed of all the same material or different kinds of materials. When composed of different kinds of materials, as in the case of, e.g., a multilayered cake, it is quite preferable that this be attained by the simple mechanical method.

SUMMARY OF THE INVENTION

It is a primary object of the present invention to provide a layered structure manufacturing method capable of easily consecutively manufacturing a layered structure superposed with a plurality of layers by repeating confluence and divergence thereof and of attaining this by a simple mechanical method.

It is another object of the present invention to provide a layered structure manufacturing method of easily consecutively manufacturing a layered structure by use of different materials to be shaped when manufacturing the layered structure, in which layers adjacent to each other are composed of shaped materials different from each other.

To obviate the technical problems described above, a method of manufacturing a layered structure according to the present invention is contrived as follows. To be specific, a method of manufacturing a layered structure comprises a feeding step of feeding materials to be shaped from the inlets of the irregular passageways, which materials exhibit a fluidity or plasticity by employing a shaping apparatus including a plurality of irregular passageways disposed in a side-by-side relationship in the same direction in which sectional configurations of the irregular passageways continuously vary from inlets thereof toward outlets thereof, the irregular passageways being superposed on each other at the outlets thereof, a shaping step of shaping the materials to be shaped by continuously changing sectional configurations of the shaped materials, and a confluent/diverging step of making confluent and diverging the shaped materials flowing inside the irregular passageways in the process of the shaping step.

Herein, the layered structure with adjacent layers composed of shaped materials different from each other, is manufactured by feeding the shaped materials different from each other into the inlets of said irregular passageways, and by shaping the materials in a plurality of layers.

Further, the confluence can also be controlled by staggering the time when the shaped materials flowing inside the irregular passageways get confluent with each other in the process of the shaping step.

Moreover, the confluence control can also be executed by changing lengths of the irregular passageways themselves or changing substantial lengths of the irregular passageways by providing bypasses.

Furthermore, a part of the material to be mixed in the shaped materials may also be fed into at least one of the irregular passageways midways of through the length of that irregular passageway.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
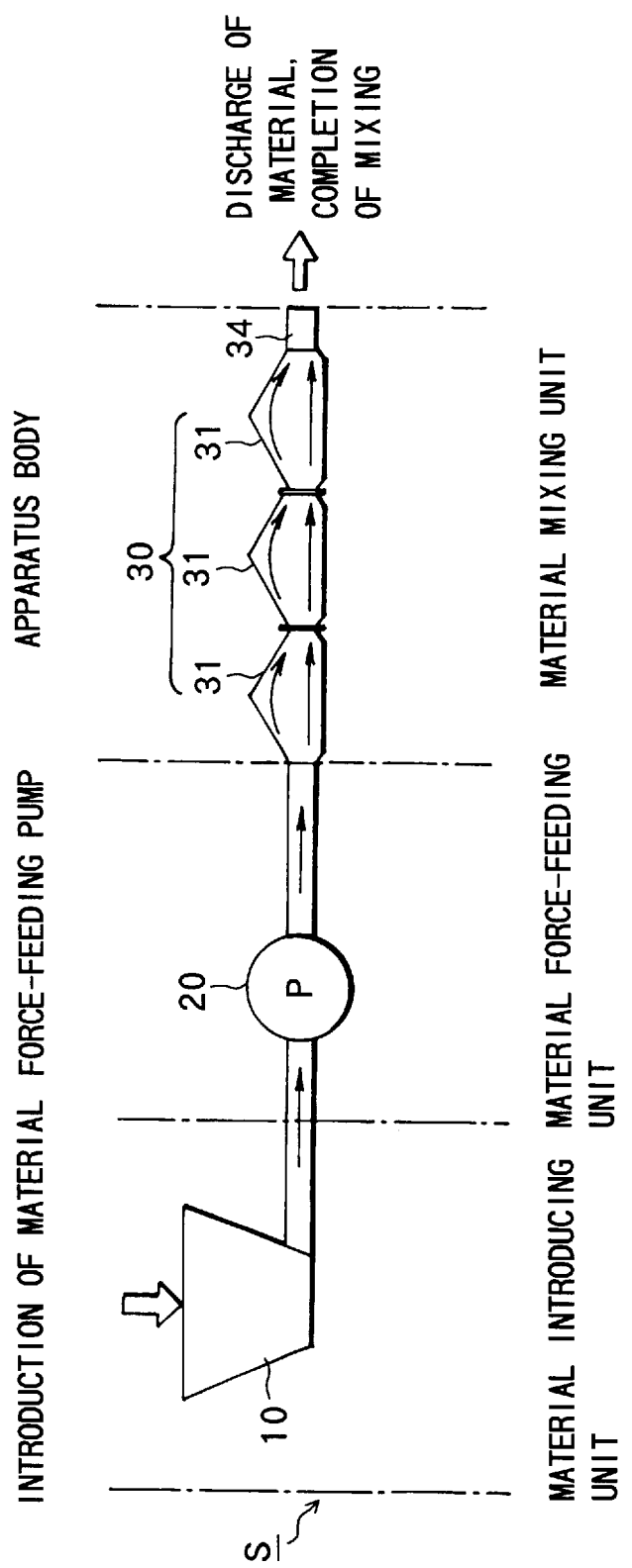
FIG. 1 is a diagram showing an outline of the parts in the parts in a shaping apparatus using a method of manufacturing a layered structure according to the present invention.
Figure 2:
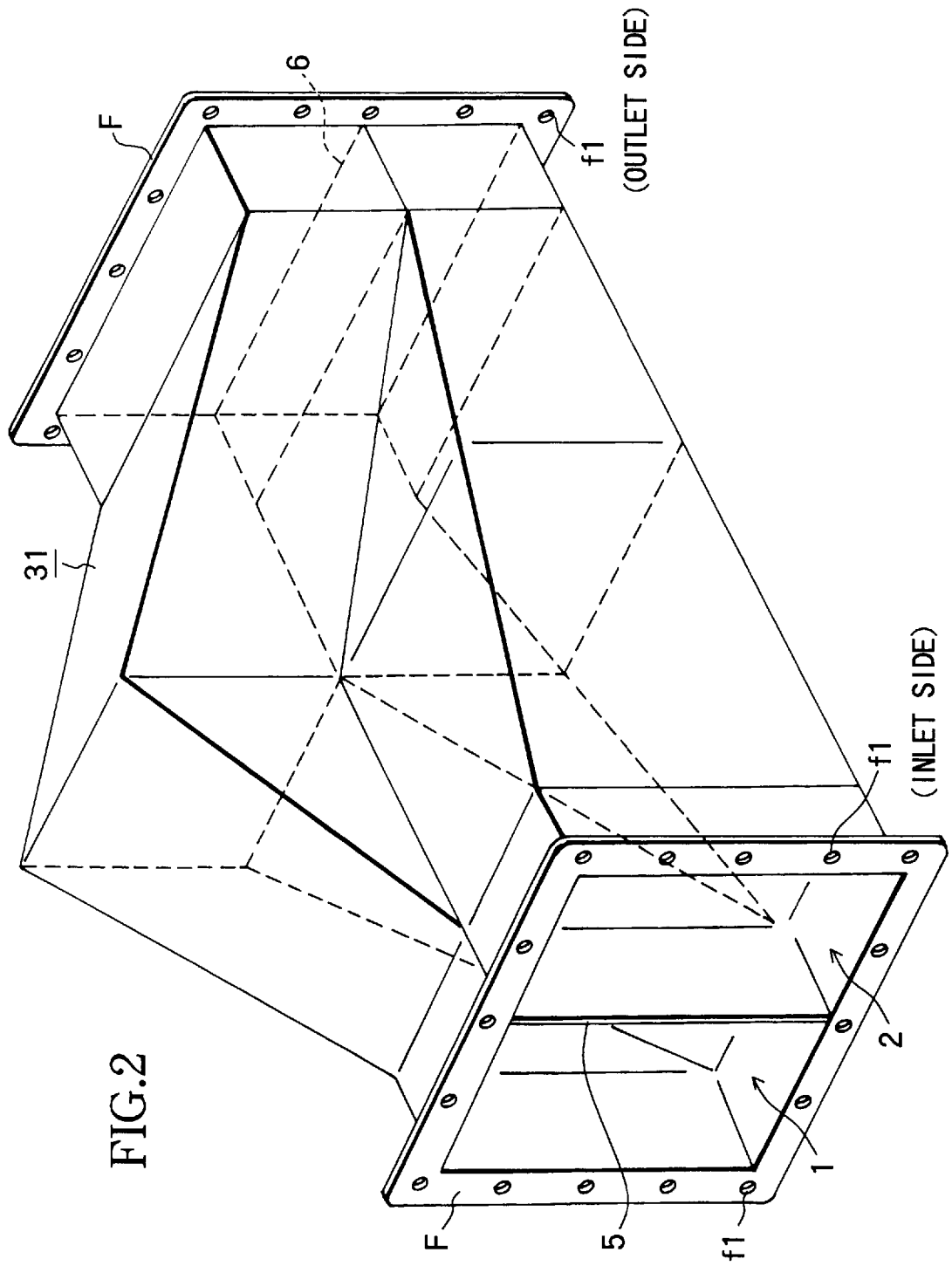
FIG. 2 is a perspective view illustrating one element partly constituting an apparatus body of the shaping apparatus shown in FIG. 1.
Figure 3:
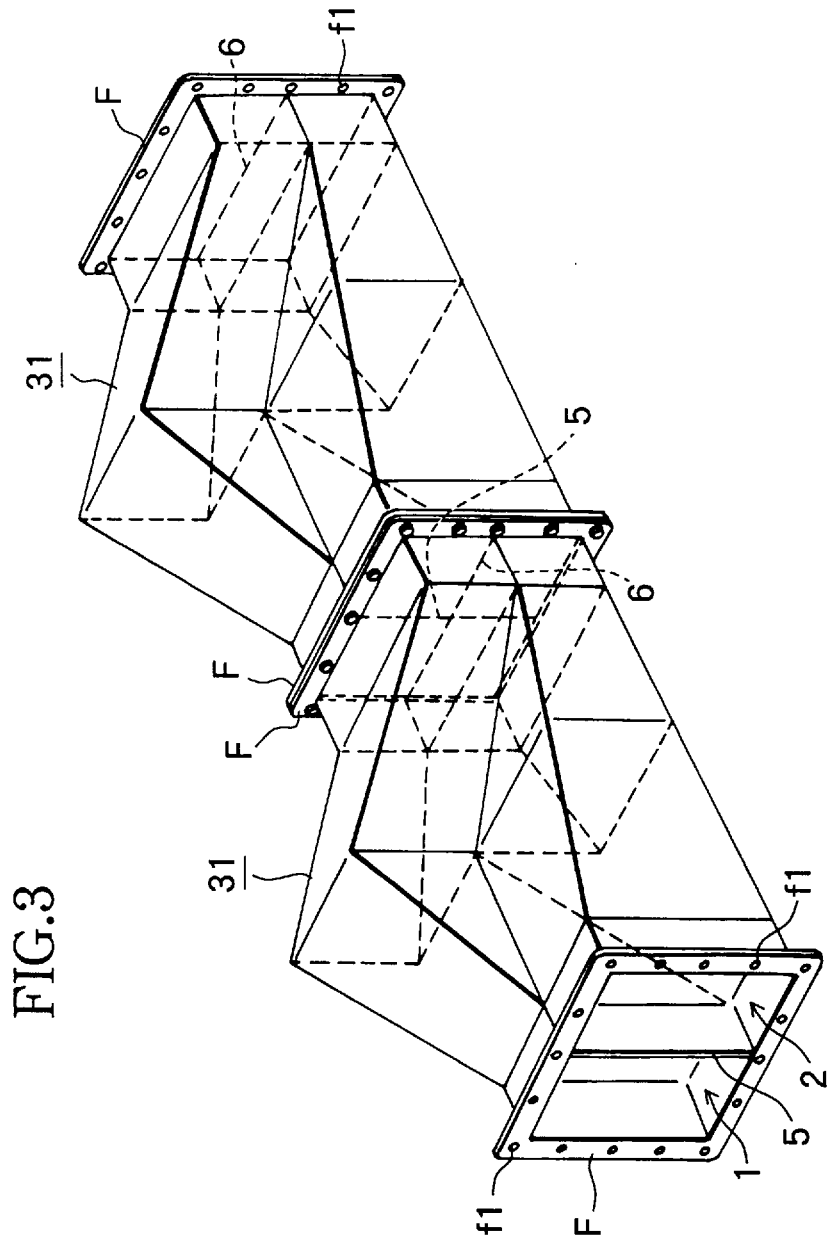
FIG. 3 is a perspective view illustrating a state where two elements shown in FIG. 2 are connected in series.

FIG. 1 is a view illustrating an outline of the parts in a shaping apparatus suitable for use for a method of manufacturing a layered structure according to the present invention. FIG. 2 is a perspective view showing an element of an apparatus body of this shaping apparatus. FIG. 3 is a perspective view illustrating a state where the elements are connected to each other.

To start with, the diagram of the parts in a shaping apparatus S shown in FIG. 1 will be described. This shaping apparatus S is constructed of a material introducing unit, a material force-feeding unit, and a material shaping unit. The material introducing unit consisting of a so-called hopper 10 previously mixes, if a material to be shaped is a food, e.g., a pie dough, the material needed therefor, and reserves the material prepared to have an adequate viscosity or plasticity or fluidity. The material introducing unit then supplies the material force-feeding unit with the material. The material force-feeding unit, consisting of a force-feeding pump 20, feeds the shaped material to the material shaping unit (an apparatus body 30) by pressurization.

The apparatus body 30 defined as this material shaping unit is constructed of three pieces of elements 31 each having the same configuration and connected in series. Then, the shaped material consecutively passes through the respective elements 31 of the apparatus body 30 and is discharged from a discharge port 34.

Flanges F for connecting the elements 31 to each other are, as illustrated in FIGS. 2 and 3, provided at edges of the respective elements 31. These elements 31 are connected in series by fastening the flanges F to each other by tightening bolts into a plurality of bolt holes f1 formed in the flanges F.

Each element 31 includes two irregular passageways 1, 2 disposed in a side-by-side relationship in the same direction. As illustrated in FIG. 3, the edge portion of one element 31, which portion is formed with outlets of the irregular passageways 1, 2, is connected to the edge portion of the other element 31 that is formed with inlets. Then, a confluent/divergent unit for the shaped materials at an intermediate portion within the apparatus body consists of the outlets and inlets of the respective irregular passageways, which are formed at the outlet-side edge portion and the inlet-side edge portion that serve as the connecting portion between the two elements 31.

More specifically, referring to FIG. 2, as viewed from the edge surface of this element 31, square bores at one edge portion and the other edge portion of the element, are formed with two inlets and two outlets each partitioned by partition walls 5, 6 at their centers. However, the partition wall 5 at the inlet-side edge portion of the element and the partition wall 6 at the outlet-side edge portion of the element, are disposed in directions 90 degrees apart from each other.

Accordingly, an arrangement pattern of the two inlets of the irregular passageways 1, 2 is such that the rectangular bores are formed right and left in the side-by-side relationship, while an arrangement pattern of the two outlets thereof is that the rectangular bores are formed up and down in the side-by-side relationship. A required number of such elements 31 are so employed as to be connected in series, and it follows that the confluent/divergent unit for the shaped materials is constituted at each connecting portion.

Next, specific configurations of the irregular passageways 1, 2 will be described. A sectional configuration of each of the irregular passageways 1, 2 continuously varies as it extends from the inlet toward the outlet. In terms of a variation form thereof, a sectional area in an arbitrary position remains the same from the inlet through the outlet, and only the sectional configuration continuously varies. To be specific, the inlet assumes a lengthwise elongate rectangular shape; the intermediate portion between the inlet and the outlet takes a square shape in its sectional configuration; and the outlet assumes a crosswise elongate rectangular shape.

Hence, the shaped materials passing through the respective irregular passageways 1, 2 are varied in their sectional configurations so that the lengthwise elongate rectangle is gradually reshaped into the square and further reshaped little by little therefrom into the crosswise elongate rectangle. Then, as stated above, the outlets are disposed at the outlet-side edge portion with such a pattern that the two crosswise elongate rectangles are arranged up and down in the side-by-side relationship. It therefore follows that the shaped materials coming out of the outlet-side edge portion of the element 31 are further equally halved right and left at the inlet-side edge portion of the next element 31 subsequent thereto. These varied states of the shaped materials correspond to the confluence and divergence connoted according to the present invention.

The irregular passageways 1 and 2 are different in terms of their lengths as illustrated in the FIGS. 1 and 2. That is, the irregular passageway 1 is bent upward, while the irregular passageway 2 extends substantially straight. As a result, the irregular passageway 1 is substantially longer than the irregular passageway 2. Hence, the shaped materials flowing through the irregular passageway 1 reach the outlet of the element 31 later than the shaped materials flowing through the irregular passageway 2, with the result that these two masses of shaped materials get confluent at a staggered timing.

Note that there may be employed the element 31 including the irregular passageways 1, 2 each having the same length, depending on the type of the layered structure to be manufactured, and it may be more advantageous in some cases to employ the thus constructed element.

Figure 4:
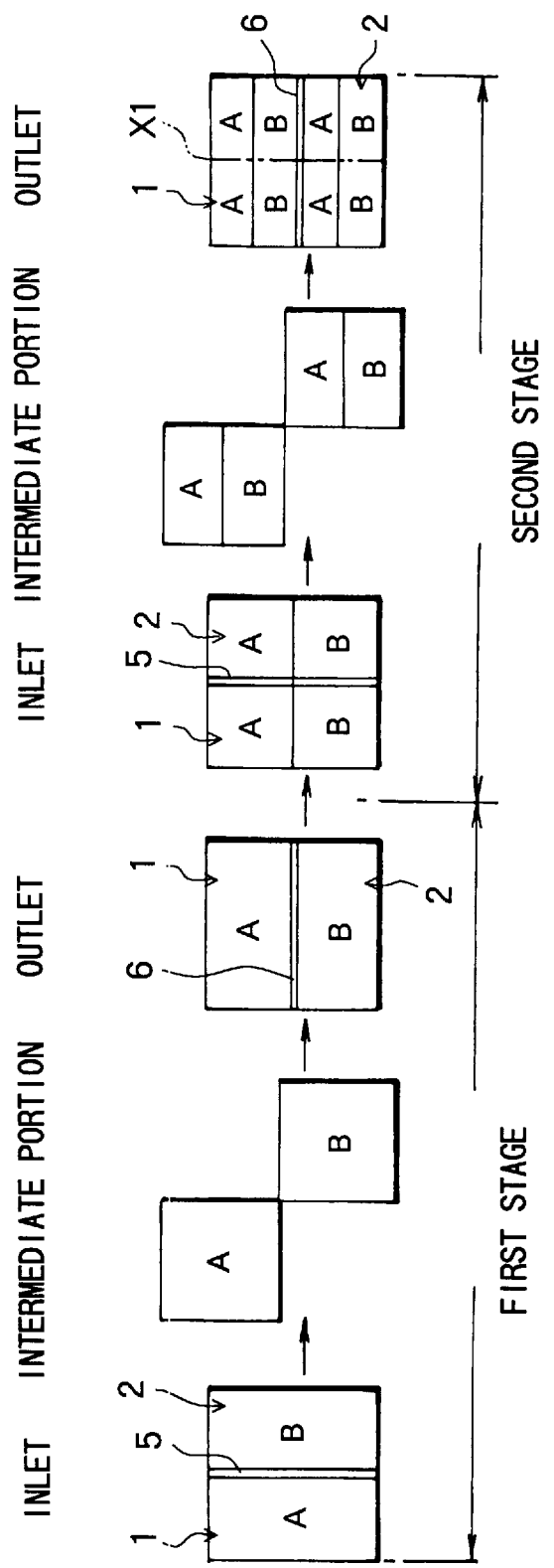
FIG. 4 is a step diagram showing a state where a sectional configuration of the shaped materials varies when manufacturing the layered structure by use of the elements shown in FIG. 2.

A method of manufacturing the layered structure by use of the shaping apparatus S will be herein explained with reference to FIG. 4 showing shaping steps thereof. Note that this step diagram shows the sectional varied forms of the shaped materials when two pieces (two stages) of elements 31 are connected, with respect to areas of the inlet-side edge portion, the intermediate portion and the outlet-side edge portion of the respective elements 31.

As can be clearly understood from FIG. 4, to begin with, the shaped materials force-fed in by the force-feeding pump 20 are halved into A and B at the inlet-side edge portion by the first-stage element 31. Each of the sectional configurations of the resulting halved shaped materials is the lengthwise elongate rectangle.

Next, at the first-stage intermediate portion, each mass of the shaped materials A, B is reshaped in sectional configuration into the square and further, at the first-stage outlet-side edge portion, reshaped into the crosswise elongate rectangle. Accordingly, each mass of the shaped materials A, B is reshaped like this: lengthwise elongate rectangle→square→crosswise elongate rectangle. In the process of these variations, the shaped materials passing through the irregular passageways 1, 2 are reshaped in terms of their sectional configurations while undergoing continuous compacting action given by internal wall surfaces of the respective irregular passageways 1, 2.

Note that the irregular passageways 1, 2 are different in their lengths at this time, and hence the time when the shaped materials flow trough the two irregular passageways 1, 2 and get confluent downstream are staggered. Namely, the confluences are staggered each other. Accordingly, the masses of shaped materials get confluent with a stagger in the back-and-forth direction of their fluxes.

Next, the partition wall 5 at the inlet-side edge portion of the second-stage element 31 orthogonally intersects the partition wall 6 at the outlet-side edge portion of the first-stage element, and therefore the shaped materials A, B extruded out of the outlet-side edge portion of the first-stage element and vertically layered are diverged right and left into an A/B layered mass and another A/B layered mass as illustrated in FIG. 4. Then, it follows that the A/B layered masses of the shaped materials flow through the respective irregular passageways 1, 2. That is, at the inlet-side edge portion of the second-stage element 31, some of the shaped materials A, B become confluent up and down within the respective irregular passageways 1, 2, and the layered mass within each passageway assumes the lengthwise elongate rectangle in sectional configuration.

Subsequently, at the second-stage intermediate portion, the sectional configuration of each A/B layered mass of the shaped materials is reshaped into the square on the whole, and reshaped into the crosswise elongate rectangle at the outlet-side edge portion. At this second stage also, the A/B layered mass of the shaped materials varies such as: lengthwise elongate rectangle→square→crosswise elongate rectangle. Then, in the process of such variations, it follows that the A/B layered mass of the shaped materials is reshaped in the sectional configuration while being subjected to the continuous compacting action by the internal wall surfaces of the individual irregular passageways 1, 2.

As a matter of course, at the second stage also, the irregular passageways 1, 2 of the second-stage element 31 are different in their length, and consequently there are staggered the timings when the shaped materials flowing inside the two irregular passageways 1, 2 get confluent each other at the outlet-side edge portion of the element 31. Accordingly, it follows that the shaped materials diverge in the sectional direction in the second-stage element 31 and, besides, are staggered each other in the flowing direction, i.e., in the back-and-forth direction. Note that if the irregular passageways 1, 2 have the same length, as a matter of course, the above divergence and stagger never occur.

Although the third stage is not particularly illustrated, at the third-stage inlet-side edge portion, the shaped materials are divided right and left as an added imaginary line X1 indicates and get confluent up and down such as A/B/A/B. Those shaped materials are layered on the last layered mass at the second-stage outlet-side edge portion shown in FIG. 4. After this stage, it follows that the shaped materials are stepwise layered thin as in the case of the first and second stages.

Hence, when the two irregular passageways 1, 2 are formed in each element 31, the shaped materials are extruded as 4-layered masses from the second-stage outlet-side edge portion. Then, the shaped materials are excluded as 8-layered masses from the third-stage outlet-side edge portion, 16-layered masses from the fourth-stage outlet-side edge portion, and 32-layered masses from the fifth-stage outlet-side edge portion. Therefore, in the case of making the pie dough, the number of stages needed may be predetermined for the production thereof.

Figure 5:
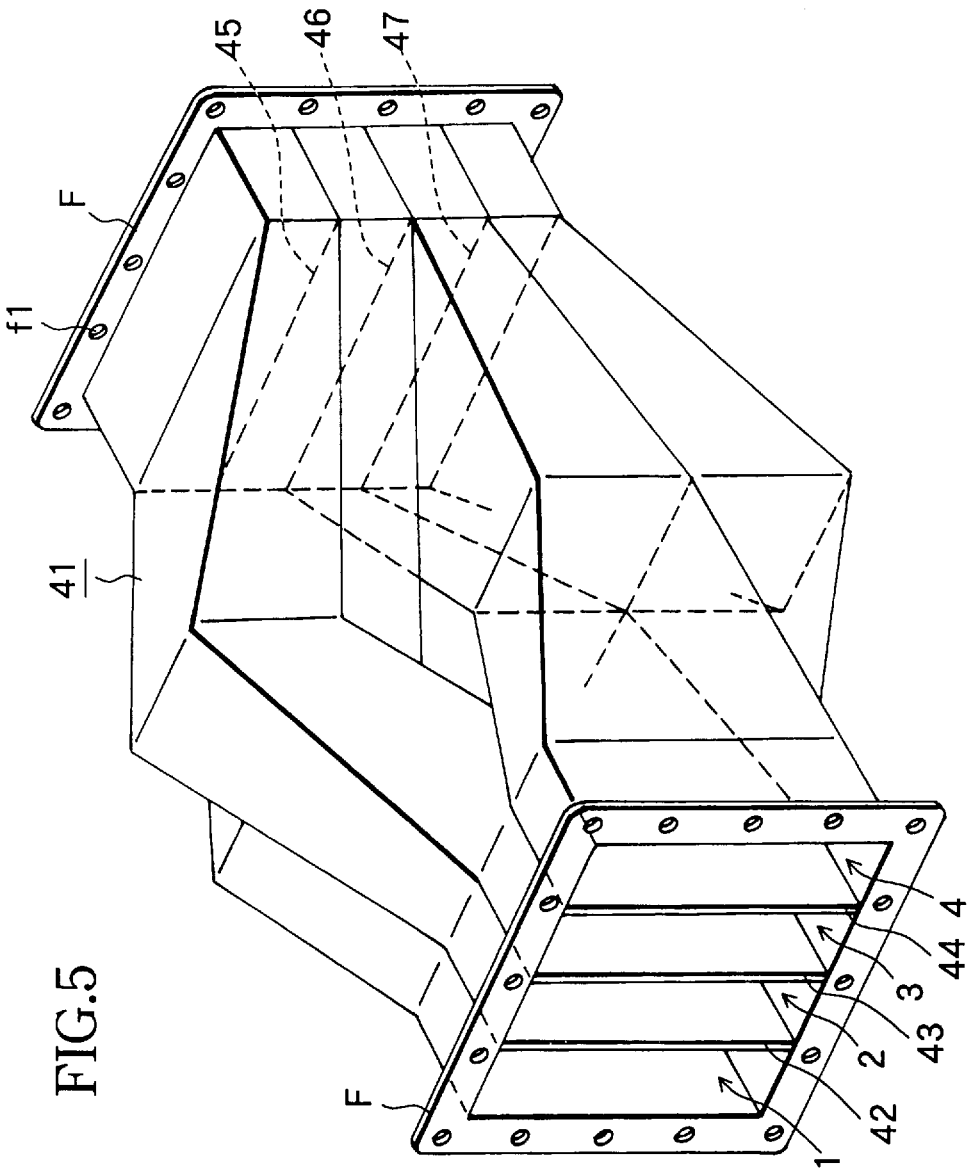
FIG. 5 is a perspective view showing another example of the element constituting the apparatus body of the shaping apparatus employed for the layered structure manufacturing method according to the present invention.

FIG. 5 illustrates another example of in the apparatus body of the shaping apparatus that is employed for the method of manufacturing the layered structure according to the present invention. This element 41 includes four irregular passageways 1, 2, 3, 4 based on the same tenor as the embodiment discussed above. The element 41 generally also forms a square bore at the edge portion including the connection flange F.

The inlets of the respective irregular passageways 1, 2, 3, 4 are, however, formed in narrow elongate rectangular shapes, wherein the square bore at the inlet-side edge portion of the element 41 is lengthwise divided into four bore segments by three partition walls 42, 43, 44 extending lengthwise. Further, the respective outlets are formed in the crosswise narrow elongate rectangular shape by partition walls 45, 46, 47 extending crosswise. As illustrated in FIG. 5, the inlet of the irregular passageway 1 communicates with the outlet that is the second from above. The inlet of the irregular passageway 2 communicates with the uppermost outlet, and the inlet of the irregular passageway 3 communicates with the lowermost outlet. The inlet of the irregular passageway 4 communicates with the outlet that is the third from above.

The variations in sectional configuration of each of the irregular passageways 1, 2, 3, 4 in their longitudinal directions, are basically the same as those in the element 31 shown in the preceding embodiment. An entire outline of the element 41 is, however, different because of having the four irregular passageways. Further, in this element 41, the lengths of the irregular passageways 1, 2, 3, 4 are all different. To be specific, the irregular passageway 2 is formed longest; next the irregular passageways 1, 3 follow in this sequence; and the irregular passageway 75 is shortest.

As a matter of course, in the case of this element 41 also, the element including the irregular passageways 1, 2, 3, 4 each having the same length is usable depending on the layered structure to be manufactured, and it might be more advantageous to use the thus constructed element as the case may be.

Figure 6:
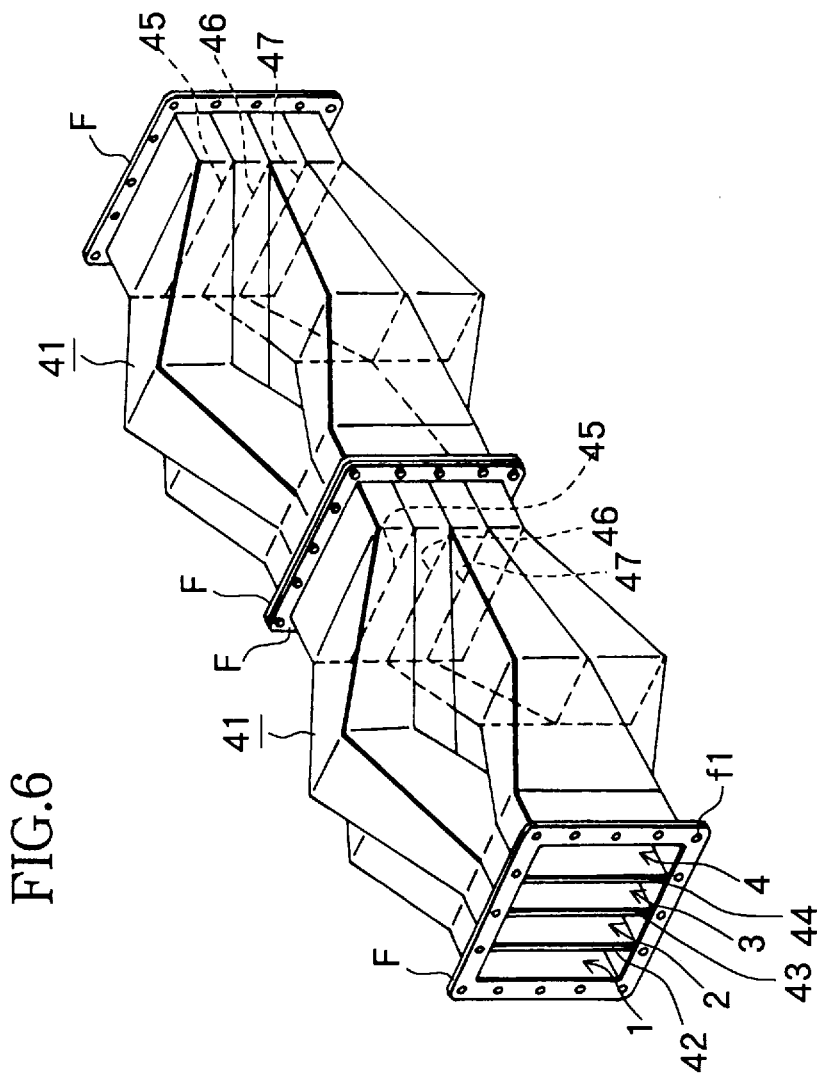
FIG. 6 is a perspective view of the apparatus body, showing a state where the two elements shown in FIG. 5 are connected in series.

Flanges F for connecting the elements 41 to each other are, as illustrated in FIGS. 5 and 6, provided along the edge portions of the elements 41. These respective elements 41 are connected in series by fastening the flanges F to each other by tightening bolts into the plurality of bolt holes f1 formed in the flanges F. That is, as depicted in FIG. 6, the edge portion of one element that is formed with the outlets of the respective irregular passageways 1, 2, 3, 4, is connected to the edge portion of the other element 41 that is formed with the inlets. Then, the confluent/divergent unit for the shaped materials at the intermediate portion within the apparatus body consists of the outlets and inlets of the respective irregular passageways, which are formed at the outlet-side edge portion and the inlet-side edge portion that serve as the connecting portion between the two elements 41.

Figure 7:
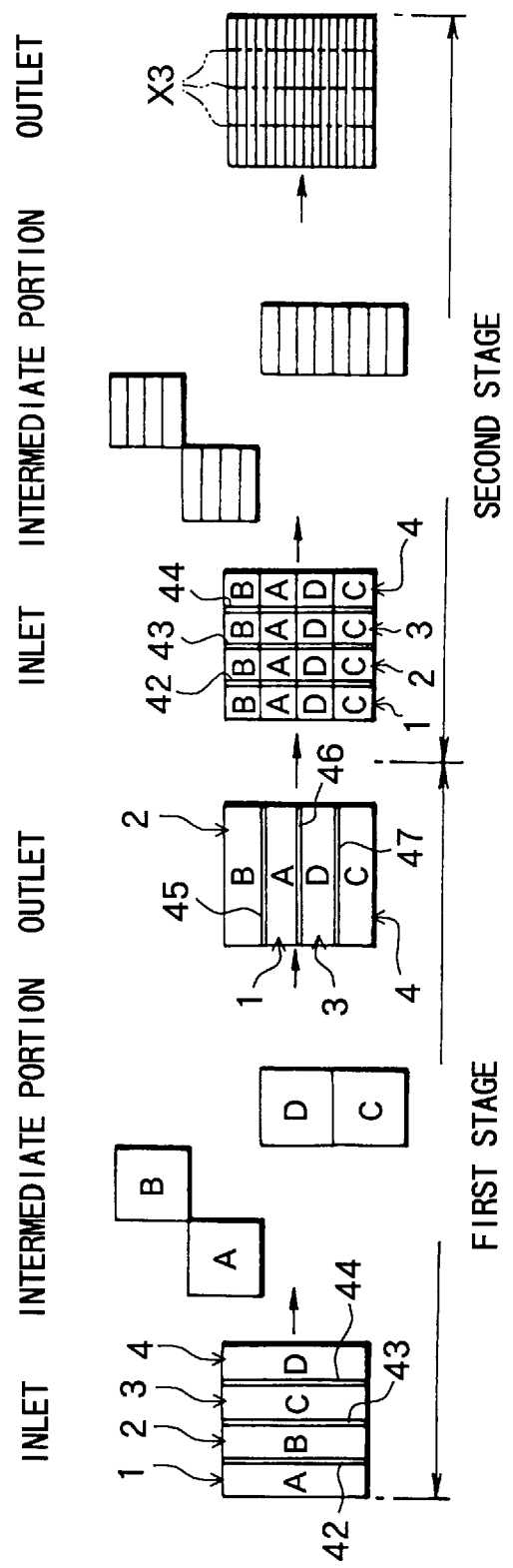
FIG. 7 is a step diagram showing a state where the sectional configuration of the shaped material varies when manufacturing the layered structure by use of the element shown in FIG. 5.

FIG. 7 is a step diagram showing steps of shaping the layered structure in the shaping apparatus including the apparatus body that is constructed by connecting the two elements 41. Accordingly, the bore at the inlet-side edge portion of each of the elements 41 corresponding to the first and second stages, is partitioned so that four pieces of lengthwise elongate rectangles are arranged in the side-by-side relationship. The shaped material entering the first element 41 is thereby divided into A, B, C, and D, and the respective masses of shaped materials get confluent in 16 crosswise elongate layers at the outlet-side edge portion of the second-stage element 41. herein, a imaginary line X3 indicates the dividing line at the next third stage. As obvious from the above-mentioned, the shaped materials are superposed in 64 layers at the third stage, and thereafter in 256 layers, 1204 layers, . . . , thus sequentially shaping the layered structures in which the materials are superposed in 4-fold layers.

As can be comprehended from these embodiments discussed above, the efficiency is more enhanced with a larger number of partitions in a relationship between the number of irregular passageways and the number of superposed layers. Hence, the multi-layered thin structure as in the pie dough among the layered structures to be manufactured, is obtained by use of the shaping apparatus with a large number of bore partitions or the multiplicity of connected elements.

Depending on a degree of fluidity or a particle size of the shaped material, however, it is preferable that the inlet portion might not be minutely divided as the case may be. Accordingly, it is desirable to set the number of irregular passageways and a dimension of the sectional area in accordance with the viscosity or plasticity or fluidity of the shaped material.

Further, the following can be comprehended with respect to the variations in the sectional configuration of the shaped material. The heightwise dimension at the outlet versus the heightwise dimension at the inlet continuously changes at a rate of 1/number-of-partitions. Further, the widthwise dimension at the outlet versus the widthwise dimension at the inlet continuously varies to become a several-fold value as large as the number of partition walls.

By the way, an inter-layer stagger is caused not only in the sectional direction but also in the so-called back-and-forth direction by staggering, as described above, the timings (executing the confluence control step) when the shaped materials flowing inside the respective irregular passageways get confluent. From this point of view, there may be considered methods of changing the thickness of each irregular passageway and providing bypasses in addition to the conception of changing the lengths of the respective irregular passageways as in the examples given above.

Figure 8:
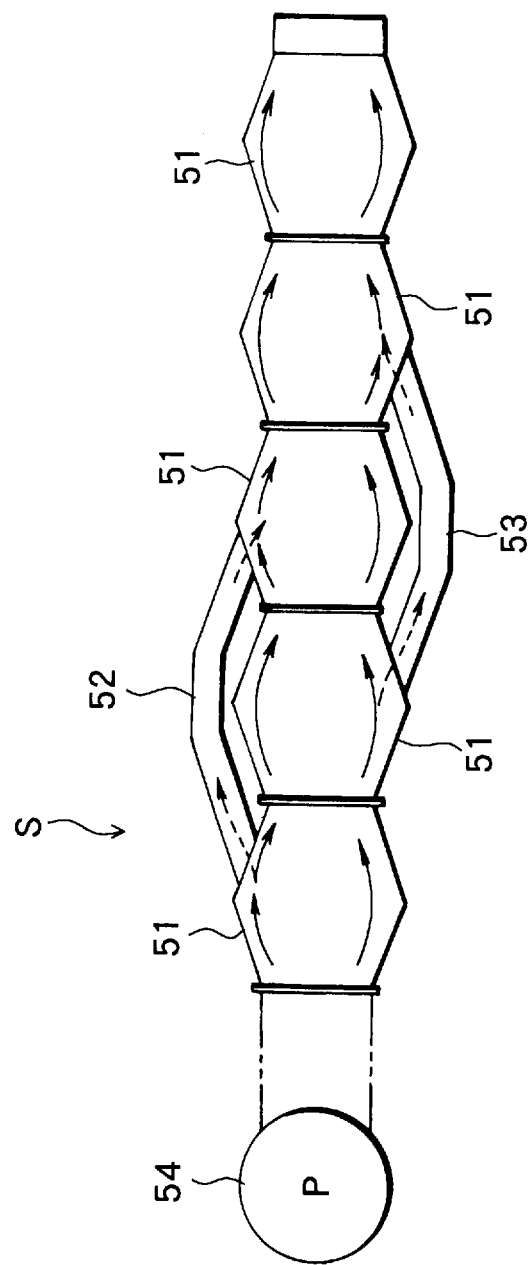
FIG. 8 is a view schematically illustrating a construction of another embodiment of the shaping apparatus used for the layered manufacturing method according to the present invention.

FIG. 8 is a view conceptually showing the method of manufacturing the layered structure which involves the confluent control. Hereinafter, the shaping apparatus used for the method of manufacturing the layered structure will be explained. Bypasses 52, 53 are provided in the shaping apparatus S including the multiplicity of elements 51 connected in series. One of the irregular passageways of the first-stage element 51 communicated via the bypass 52 with one of the third-stage irregular passageways. The second- and fourth-stage irregular passageways communicate with each other via the bypass 53.

Hence, when the shaped materials are fed by pressurization into the first-stage element 51 by a pump 54, the shaped material flowing a certain irregular passageway connected to the bypass 52 flows into the irregular passageway of the third-stage element 51 in the course of flowing through the respective passageways of the first-stage element 51. Further, the shaped material flowing through the irregular passageways of the second-stage element 51 flows via the bypass 53 into the irregular passageway of the fourth-stage element 51. As a result, the shaped materials flowing through the respective irregular passageways of the individual elements 51 get confluent or diverge with a lag, thus continuously performing the confluent control.

On the other hand, when examining a method of introducing the shaped materials into the shaping apparatus, there can be considered a case where an additional material introduction from portions excluding the inlet-side edge portion might be also better than the introduction from only the inlet-side edge portion of the first-stage element 51. There may be exemplified, if in the case of foods, additive materials, seasoning materials and coloring materials to the shaped materials.

Figure 9:
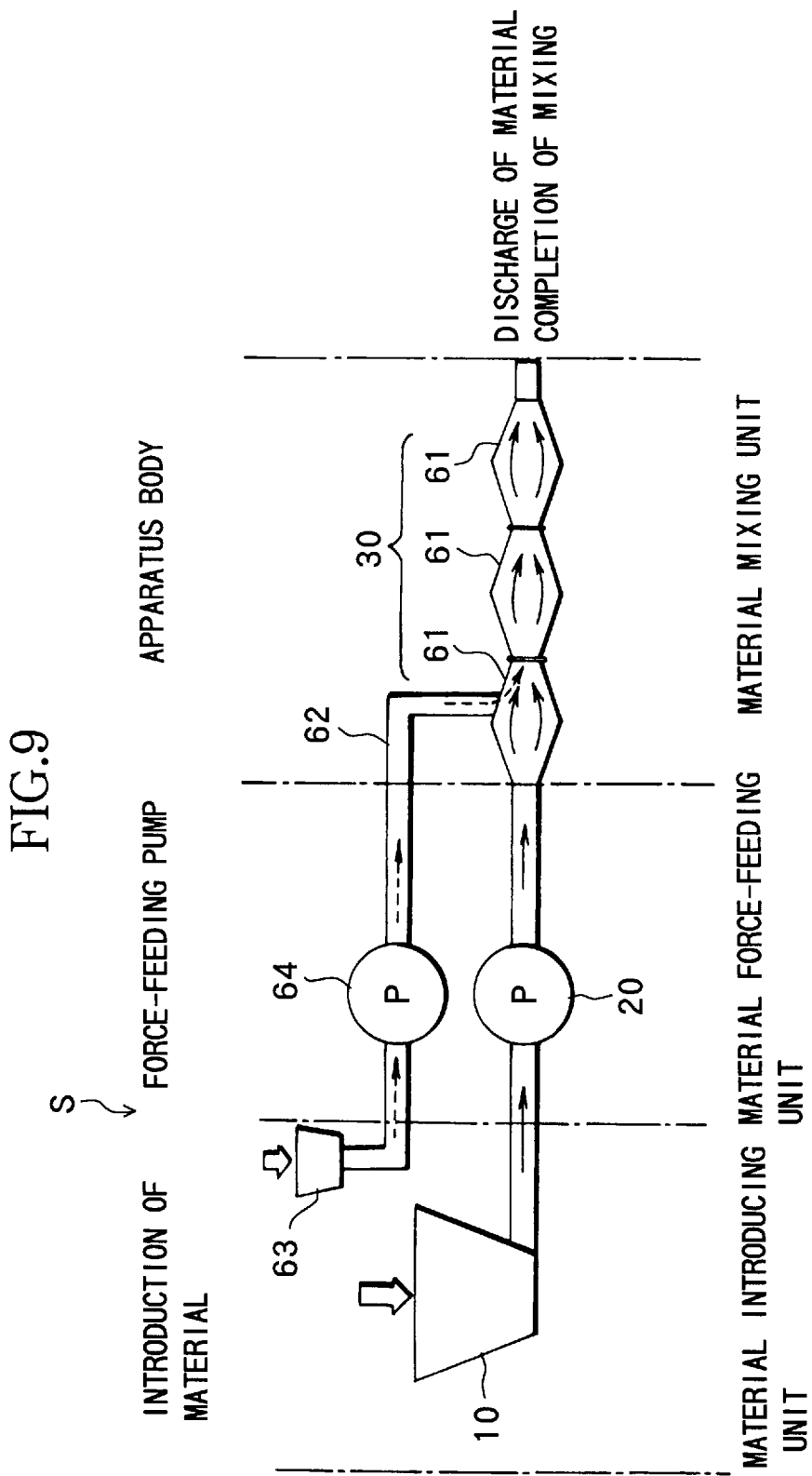
FIG. 9 is a view schematically illustrating still another embodiment of the shaping apparatus used for the layered structure manufacturing method of the present invention.
Figure 10:
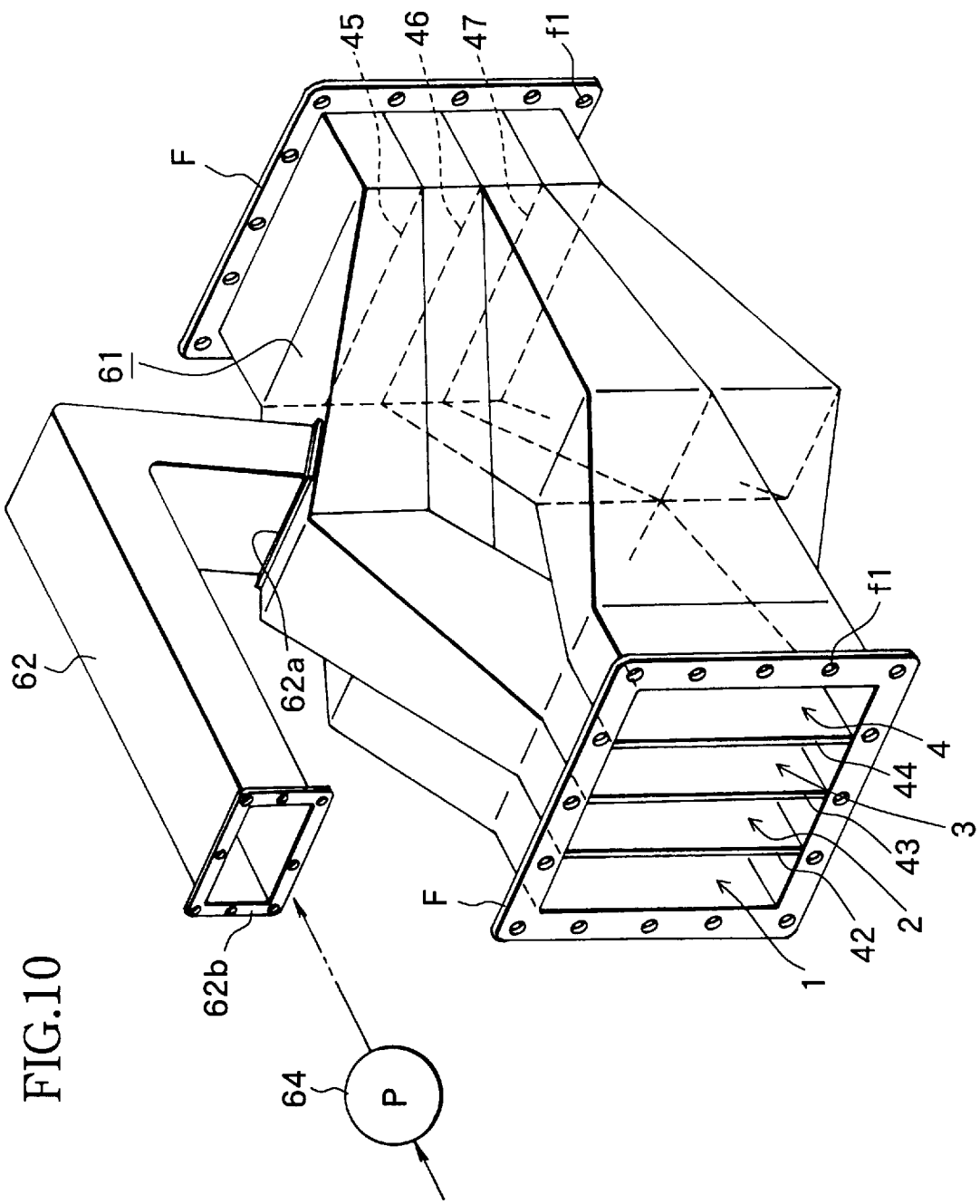
FIG. 10 is a perspective view illustrating one elements partly constituting the apparatus body of the shaping apparatus shown in FIG. 9.

FIG. 9 conceptually shows the shaping apparatus suited to embody the above conception. FIG. 10 is a perspective view illustrating an example of the elements used therein. As can be understood from FIGS. 9 and 10, the shaping apparatus S in this embodiment is constructed such that at least one of the plurality of elements 61 so used as to be connected in series includes an outside introduction pipe 62. Then, a material force-feeding unit for feeding the material from a material introduction hopper 63 by pressurization through a force-feeding pump 64, is connected to the outside introduction pipe 62. As a matter of course, the apparatus body 30 is constructed so that the main mixed materials are fed in by pressurization from the material introducing unit including a hopper 10 by the force-feeding pump 20.

A desirable position for providing the element 61 with the outside introduction pipe 62 may be set outside the irregular passageway 2 positioned upward as shown in FIG. 10 in terms of a manufacturing aspect. Further, a preferable mounting structure thereof is that the outside introduction pipe 62 is so constructed as to be attachable and detachable by providing both edges with flanges 62a, 62b. Note that the element 61 shown in FIG. 10 has four irregular passageways 1, 2, 3, 4. Accordingly, in this embodiment, there is an outside introduction pipe through which the materials are introduced into the irregular passageway 2.

Incidentally, it can be understood that the element 61 usable herein, if conditioned to include the plurality of irregular passageways, is not particularly limited such as having differences in length and thickness between the irregular passageways or including the bypasses. Moreover, as for the materials to be introduced, the same kind of materials as the main shaped materials or a different kind of materials can be introduced as the necessity arises.

Figure 11:
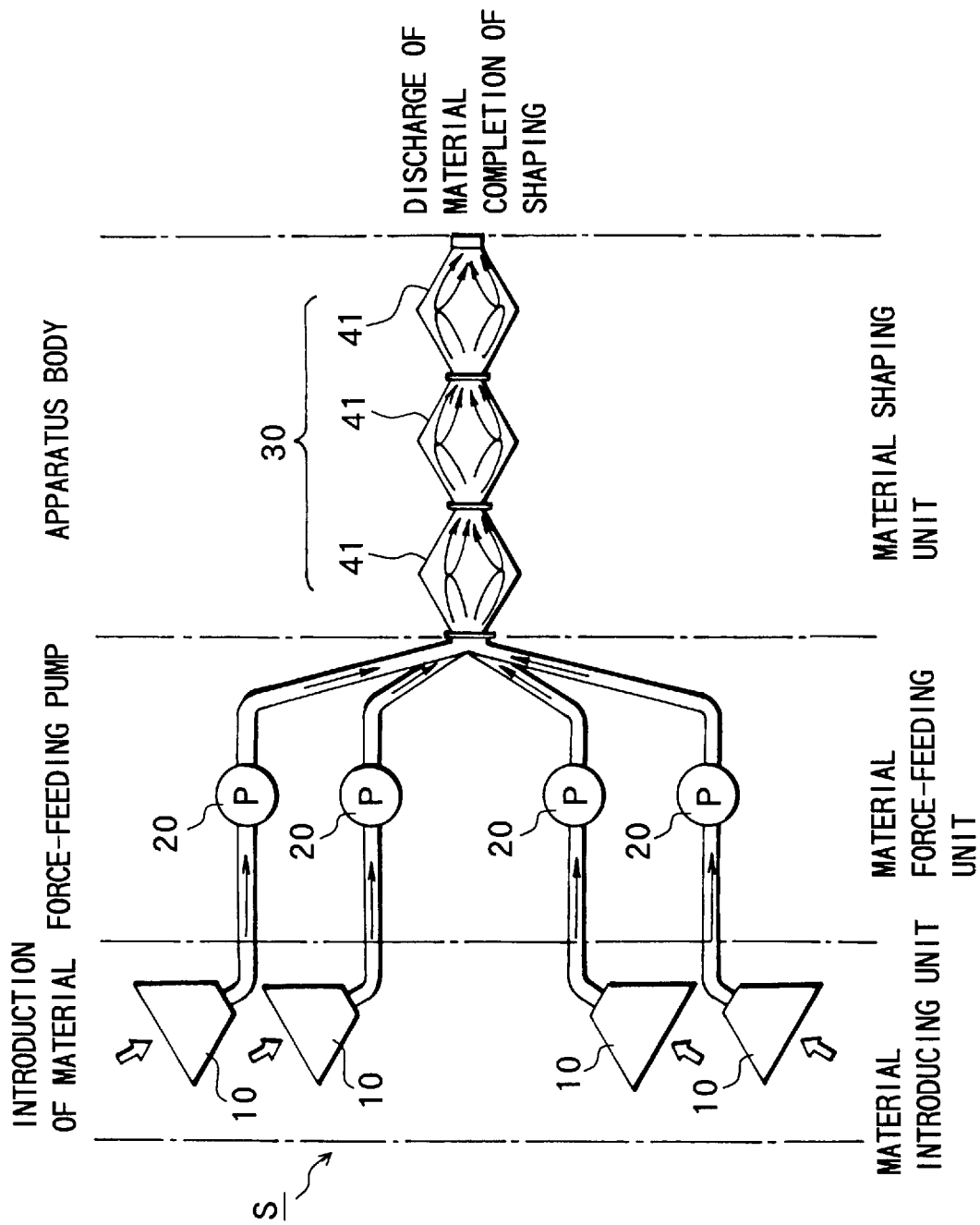
FIG. 11 is a view schematically illustrating yet another embodiment of the shaping apparatus used for the layered structure manufacturing method of the present invention.
Figure 12:
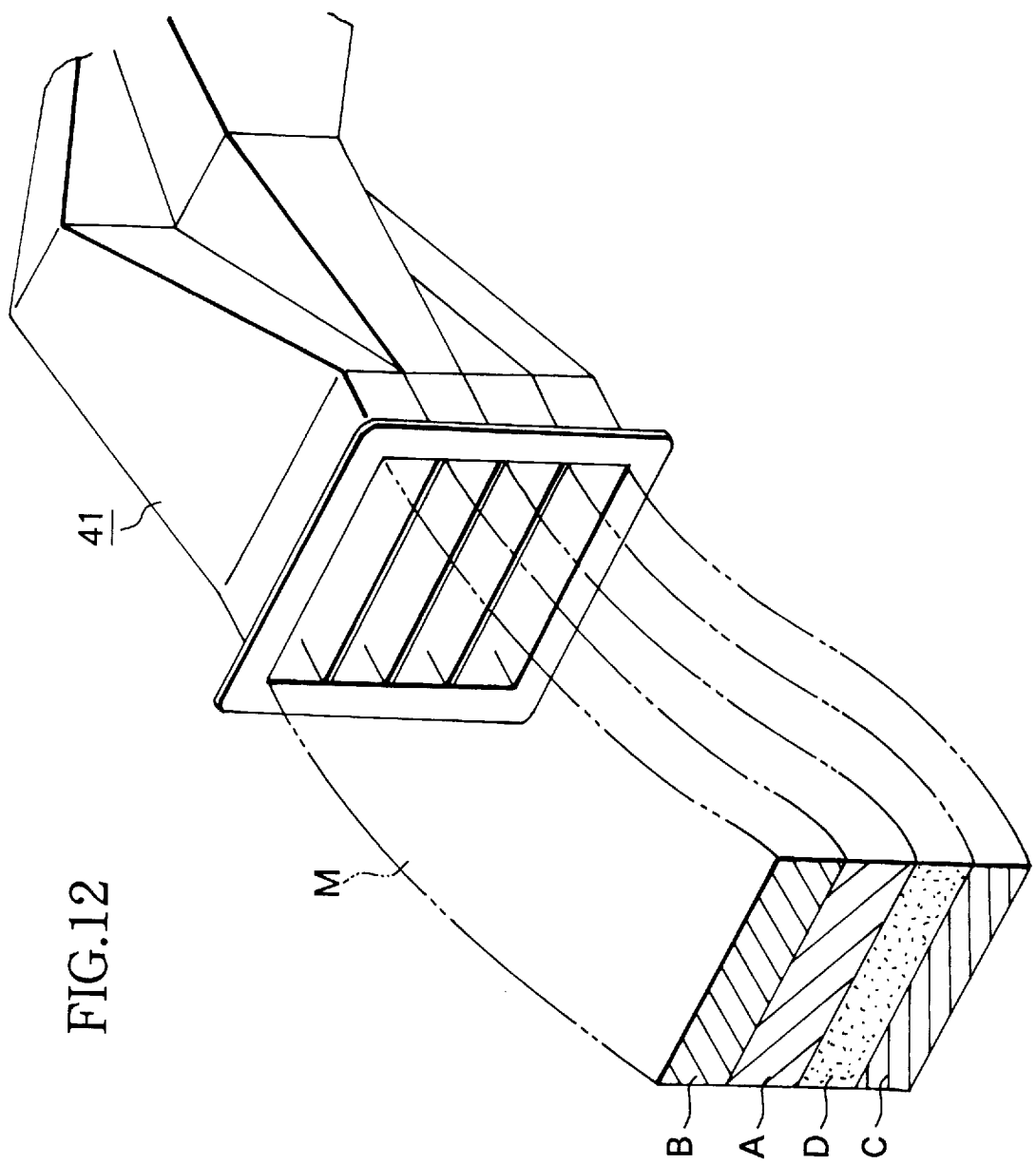
FIG. 12 is a perspective view showing a state where the shaped materials are extruded in a layered form from the first-stage element in the apparatus body of the shaping apparatus used for the layered structure manufacturing method of the present invention.
Figure 13:
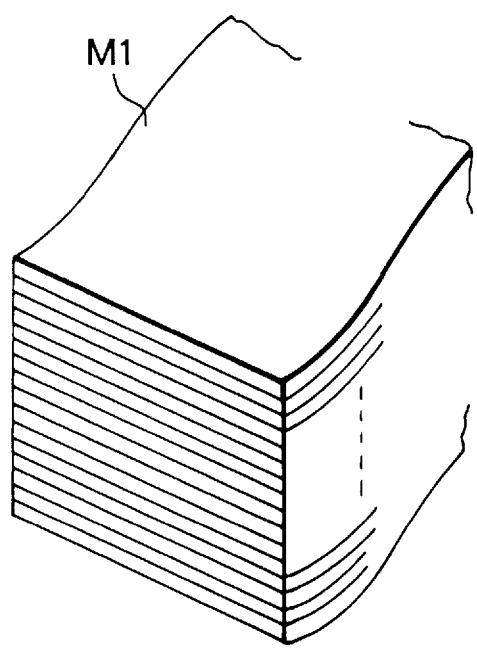
FIG. 13 is a perspective view illustrating a state where the shaped materials are extruded in the layered form from the second-stage element in the apparatus body of the shaping apparatus used for the layered structure manufacturing method of the present invention.

FIG. 11 illustrates an outline of construction of the shaping apparatus S suitable for shaping by feeding shaped materials different from each other into the respective irregular passageways when manufacturing the layered structure, which involves the use of the elements 41 including four irregular passageways. Further, FIGS. 12 and 13 show sections of the layered structures manufactured thereby. FIG. 12 illustrates a layered structure M extruded out of the outlet-side edge portion of the first-stage element 41. FIG. 13 shows a layered material M1 extruded out of the outlet-side edge portion of the second-stage element 41.

In the shaping apparatus S shown in FIG. 11, the material introduction unit having the hopper 10 and the materials force-feeding unit having the force-feeding pump 20, are independently connected to the respective inlets of the irregular passageways 1, 2, 3, 4 of the first-stage element 41. The different kinds of shaped materials can be simultaneously introduced into the respective irregular passageways of the first-stage element 41. Hence, this method is suitable for manufacturing so-called ununiform materials in which each layer material is different among the layered structures. There can be given a variety of materials such as, e.g., multilayered cakes using different materials and having characteristics and tastes in every layer, puddings, Bavarian cream, dairy products like ice cream or pasta, in addition to the above, materials for kneading products, and further resin molded products by extrusion molding.

When making use of the above method, if the dough is, e.g., a 4-layered cake, as depicted in FIG. 12, one stage of element 41 is provided, and the layered material M is extruded from the outlet-side edge portion thereof. With this availed, a 16-layered structure can be produced by connecting the elements 41 at two stages.

Incidentally, it might be better in some cases to feed the shaped materials by not pressurizing so much the shaped materials for the layered structure or by performing almost no pressurization, depending on the layered structure to be produced. In the case of such a layered structure, it is desirable that a mechanical or manual type extruding apparatus capable of a small pressure be employed as a substitute for the force-feeding pump.

Moreover, the unit for connecting the elements to each other may adopt, in addition to the flange connection system, a one-touch joint system easy to perform operations such as maintenance/inspection, internal cleaning, and decomposition.

Note that the embodiments discussed above exemplify the constructions in which the three stages (three elements in FIG. 1) or five stages of elements are provided, however, as a matter of course, more stages of elements may also be connected as the necessity arises. In this case, a series of joint elements may be so connected as to be curve d at the connecting portions, thus taking a meandering form on the whole. If connected in this manner, the designing can be made with a shorter length, correspondingly.

Further, in accordance with the embodiment, the plurality of elements each having the same construction are connected. However, two kinds of elements each having a different construction may also be alternately connected, or three or more kinds of elements may be so used as to be connected in sequence.

Furthermore, in the embodiments, the apparatus body 30 is constructed of the plurality of elements connected to each other but may also be manufactured as one united body from the beginning. Moreover, the shaped materials are applicable to a variety of materials exclusive of the above-mentioned on condition that the materials exhibit a proper fluidity.

As discussed above, according to the layered structure manufacturing method of the present invention, it is possible to easily consecutively manufacture the layered structure consisting of the plurality of layers by repeating the confluence and divergence while reshaping the sectional configuration of the shaped material itself ad, besides, to actualize this by the simple mechanical method.

Further, the shaped materials different from each other are fed out of the inlets of the respective irregular passageways, thereby making it feasible to shape them in the plurality of layers. As a result, the layered structure of the shaped materials different from each other can be easily consecutively formed of the layers adjacent to each other.

Moreover, the timings when the shaped materials flowing inside the irregular passageways get confluent, are staggered in the process of the shaping operation, thus controlling the confluence thereof. The variety of layered structures with discrepancies between the layers adjacent to each other can be easily formed.

Additionally, the confluence is controlled by changing the lengths of the irregular passageways themselves or changing the substantial lengths of the irregular passageways with the bypasses extended therefrom. It is thereby possible to vary halfway the lay-out of the respective layers containing the different kinds of materials and easily manufacture the variety of layered structures in such a form that the different kinds of materials are interposed in the middle therebetween.

Moreover, some of the materials to be mixed in the shaped materials are fed into at least one of the irregular passageways in the middle of that irregular passageway, whereby the material, characteristic, property, nature, taste and color of each of the layers of the layered materials needed for shaping can be easily altered or differed from each other. As a result, the various layered structures can be readily produced according to the necessity.

It is apparent that, in this invention, a wide range of different working modes can be formed based on the invention without deviating from the spirit and scope of the invention. This invention is not restricted by its specific working modes except being limited by the appended claims.

What is claimed is:

1. A method of manufacturing a layered structure, comprising:

a feeding step of feeding materials exhibiting a fluidity or plasticity to a plurality of inlets on a shaping apparatus, said shaping apparatus including a continuous passage starting at said inlets and formed by a plurality of substantially similarly shaped elements aligned end to end, each said element having a plurality of irregular passageways, each said irregular passageway having an inlet and an outlet, each said element having said plurality of irregular passageways disposed in a side-by-side relationship along said continuous passage, said irregular passageways having cross sectional configurations that continuously vary from said irregular passageway inlets to said irregular passageway outlets, said irregular passageways being superposed on each other at said outlets;

a shaping step of shaping said materials by forcing said materials along said irregular passageways, wherein said materials change shape to match said continuously changing cross sectional configurations of said irregular passageways within each said element as said material passes from said inlets to said outlets of said irregular passageways;

a confluent/diverging step of making said materials flowing in said irregular passageways of said element flow together at said outlet of said irregular passageways and diverging said materials as the materials flow into the inlets of subsequent irregular passageways in a subsequent element of said continuous passage, wherein said converged materials are divided by at least one edge portion that is shared by at least two inlets of said subsequent irregular passageways; and a discharging step of forming the layered structure as each irregular passageway of a last element in said continuous passage releases said material wherein said materials form superposed layers.

2. A method of manufacturing a layered structure according to claim 1, wherein the layered structure further comprises adjacent layers composed of shaped materials that are different from each other, and said feeding step further includes feeding said shaped materials different from each other into said inlets of said irregular passageways, and shaping said materials into said plurality of adjacent layers.

3. A method of manufacturing a layered structure according to claims 1 or 2, further comprising a confluence controlling step of staggering times when said materials flowing inside said irregular passageways get confluent with each other during said shaping step.

4. A method of manufacturing a layered structure according to claim 3, wherein said confluence controlling step is executed by having varying lengths of said irregular passageways in at least one said element.

5. A method of manufacturing a layered structure according to any one of claims 1 or 2, wherein further material to be mixed into said shaped materials is fed into at least one of said irregular passageways approximately midway through the length of said irregular passageway.

6. A method of manufacturing a layered structure according to claim 3, wherein said confluence controlling step is executed by having bypass passages attached to said irregular passageways.

7. A method of manufacturing a layered structure according to claim 3, wherein said confluent/diverging step further includes said materials flowing together along a generally horizontal axis defined by an edge of said outlets of said irregular passageways, said edge portion of said inlets defining a generally vertical dividing line.

8. A method of manufacturing a layered structure according to claim 1, wherein said material further maintains a constant cross sectional area while said materials change shape.

* * * * *